(12) United States Patent
Perazolo et al.

(10) Patent No.: US 7,251,584 B1
(45) Date of Patent: Jul. 31, 2007

(54) INCREMENTAL DETECTION AND VISUALIZATION OF PROBLEM PATTERNS AND SYMPTOMS BASED MONITORED EVENTS

(75) Inventors: Marcelo Perazolo, Cary, NC (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/374,672

(22) Filed: Mar. 14, 2006

(51) Int. Cl.
G06F 11/30 (2006.01)
G06F 15/00 (2006.01)

(52) U.S. Cl. ..................... 702/183; 702/182
(58) Field of Classification Search ............... 702/182, 702/183, 185, 188; 707/201, 202, 104.1; 714/25, 47, 48
See application file for complete search history.

(56) References Cited

U.S. PATENT DOCUMENTS

| 6,615,367 B1* | 9/2003 | Unkle et al. ............. 714/26 |
| 2004/0044542 A1 | 3/2004 | Beniaminy et al. |
| 2004/0172409 A1* | 9/2004 | James .................. 707/104.1 |
| 2004/0210454 A1 | 10/2004 | Coughlin et al. |
| 2004/0237077 A1 | 11/2004 | Cole et al. |
| 2005/0071217 A1 | 3/2005 | Hoogs et al. |
| 2005/0125322 A1 | 6/2005 | Lacomb et al. |
| 2005/0171801 A1 | 8/2005 | Hartman |

OTHER PUBLICATIONS

EMC Smarts Report Manager Data Sheet; May 2005; S0009; EMC Corporation, White Plains NY, 3 pages.
EMC Smarts InCharge Report Manager product information; www.smarts.com/products/service_ assurance/report_manager.shtml; EMC Corporation; 2005, 1 page.
EMC Smarts InCharge Report Manager Technical Specifications product information; www.smarts.com/products/service_assurance/report_manager.shtml; EMC Corporation; 2005, 2 pages.

* cited by examiner

*Primary Examiner*—Bryan Bui
(74) *Attorney, Agent, or Firm*—Stevens & Showalter LLP

(57) ABSTRACT

A computer system includes a symptoms database having symptoms that relate to problems, where each symptom includes an event correlation rule having corresponding predicates. To identify a root cause of a problem, collected events are correlated with symptoms based upon their associated event correlation rule(s). For each symptom at least partially matched to an event, visualization information is associated with corresponding events based upon the visualization attribute of the symptom, and textual information is associated with event based upon the recommendation of the symptom. Moreover, recommendations may be provided to an operator, such as based upon information associated with the symptom. The event and symptom data is analyzed by grouping events in the set of events based upon their associated visualization information and presenting the textual information associated with an operator-selected event.

20 Claims, 10 Drawing Sheets

US 7,251,584 B1

INCREMENTAL DETECTION AND VISUALIZATION OF PROBLEM PATTERNS AND SYMPTOMS BASED MONITORED EVENTS

BACKGROUND OF THE INVENTION

The present invention relates in general to event monitoring, and more particularly, to combining event information and symptom knowledge for root cause analysis and for problem prevention and correction. The present invention further relates to presenting event information and symptom knowledge to an operator.

An event may be used to represent a change in the state of a hardware or software component of a business system. An event may also represent a change in the status of information or knowledge of the business system that could impact the operation or processing of the system or a subset of the system. As a few simplified yet illustrative examples, an event could represent a storage device that has run out of available memory or a computer or hardware device that has become disconnected from a network. An event could also report the performance of a web-based business process via a systems management monitor that is monitoring amount of free CPU cycles available on a server, or an event could represent knowledge of a change in the status of information such as information related to a branch or department within the business, or change in information related to a customer, client, business partner, supplier or other source that interacts with, is relied upon, or is otherwise considered by the business.

Events that affect the operation of the business system need to be managed to ensure that the system operates at a satisfactory level. Accordingly, event monitoring software is available, which typically provides filtering and reporting capabilities to depict activity within the enterprise system. However, a human operator is responsible for the analysis and reaction to problems associated to the reported events. The task of monitoring events increases in complexity as the volume and sources of the events increases. Often, a combination of multiple events reveals more complex problems in the system, and human analysis becomes a hard and cumbersome task. Unfortunately, many businesses do not comprise the human expert knowledge required to associate reported events to root causes in an efficient manner. Rather, response to events may be limited to problem management and addressing of incidents after the problem has occurred, leading to the inefficient leveraging of enterprise resources.

BRIEF SUMMARY OF THE INVENTION

A method and computer usable program code configured for identifying a root cause problem in a computer system comprises retrieving symptoms from a symptoms database and iteratively performing a symptom analysis as new event information becomes available. Each of the symptoms relates to one or more root cause problems and comprises at least one event correlation rule, where each correlation rule has at least one predicate thereof. The retrieval of symptom from the symptoms database can occur prior to the symptom analysis, or the retrieval of the symptoms can occur within, or as part of the iterative process.

The symptom analysis comprises, for each iteration, collecting new events from at least one event source, correlating the collected new events with the symptoms and dynamically updating a prediction of the likelihood that select symptoms will occur. When performing the correlation, a select event participates with a select symptom if the select event satisfies at least one predicate of an associated event correlation rule of the select symptom. Also, the prediction of the likelihood that a symptom will occur is based at least upon current predicates of the event correlation rules of the select symptoms that are satisfied by the collected events.

A computer system for allowing an operator to identify a root cause to a problem comprises a symptom database, a monitor, an extractor, an analyzer and a visualizer. The symptom database comprises records of symptoms, wherein each of the symptoms relates to at least one associated root cause problem and comprises at least one event correlation rule, each correlation rule having at least one predicate thereof. The monitor collects events from at least one event source and the extractor extracts symptoms from the systems database.

The analyzer iteratively performs a symptom analysis comprising correlating the collected events with the symptoms, wherein a select event participates with a select symptom if the select event satisfies at least one predicate of an associated event correlation rule of the select symptom. The analyzer further dynamically updates a prediction of the likelihood that ones of the select symptoms will occur based at least upon current predicates of the event correlation rules of the select symptoms that are satisfied by the collected events. The visualizer groups the events that correlate with the ones of the select symptoms and for providing a user-directed visualization of the groupings.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Figure 1:
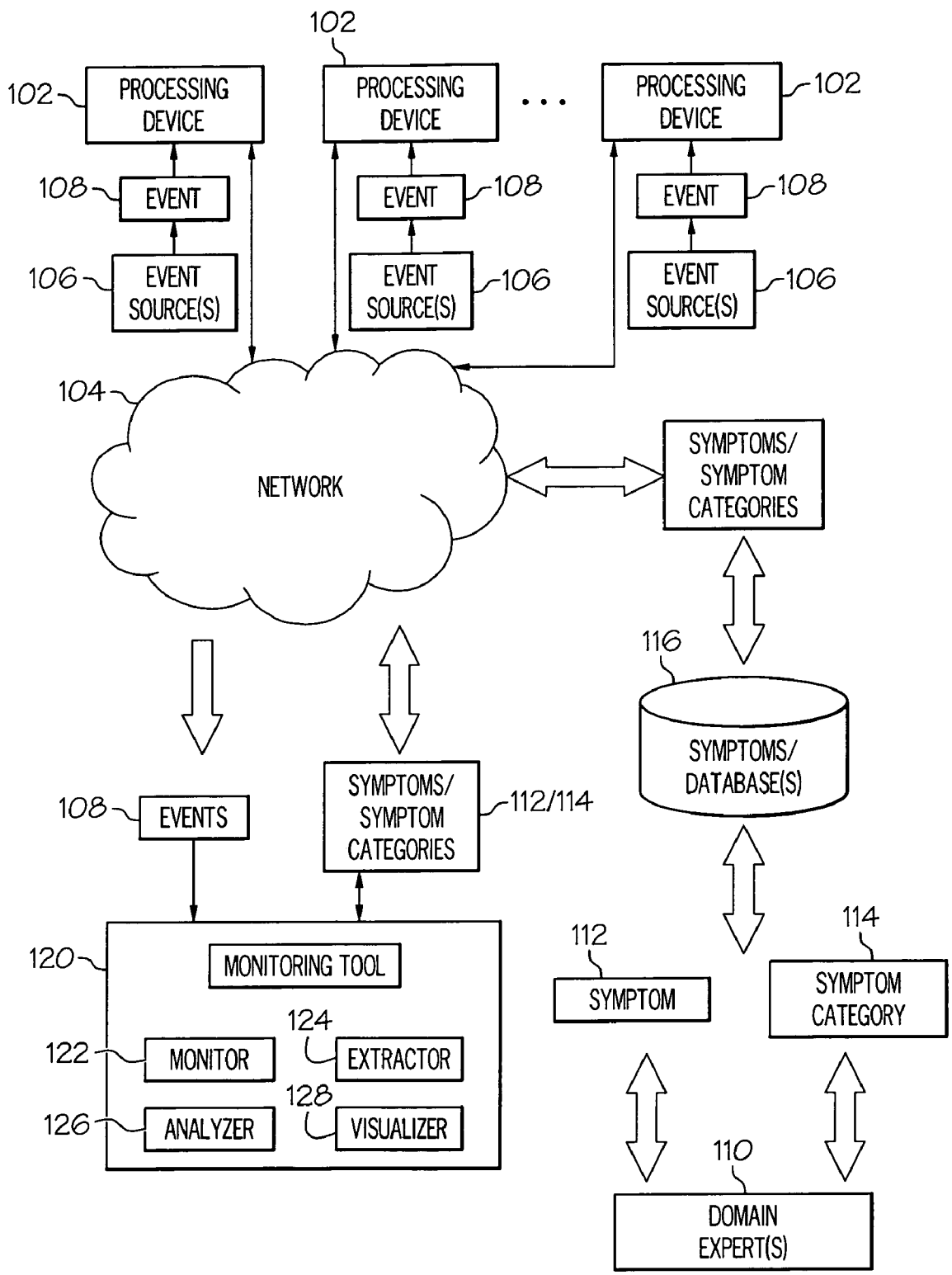
FIG. 1 is a system diagram illustrating a select components of a typical enterprise system for identifying and visualizing events and symptom data.

Referring now to the drawings and particularly to FIG. 1, a general system diagram of an enterprise system 100 is illustrated. The computer system 100 comprises a plurality hardware and/or software processing devices 102 that are linked together by a network 104. Typical processing devices 102 may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices capable of communicating over the network 104. The processing devices 102 may also comprise software, including applications that interact with various databases, spreadsheets, structured documents, unstructured documents and/or other files containing information.

The network 104 provides communications links between the various processing devices 102, and may be supported by networking components that interconnect the processing devices 102, including for example, routers, hubs, firewalls, network interfaces wired or wireless communications links and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

Although the exemplary system 100 is illustrated as a distributed computing system, it is also possible to practice various aspects of the present invention within a single processing device, such as a server computer. As such, the network 104 is shown by way of illustration, and not by way of limitation, as a computing environment in which various aspects of the present invention may be practiced.

In order to allow operators to support, maintain, manage and troubleshoot the system 100, a plurality of event sources 106 are provided. A representative event source 106 may comprise software, e.g., an application or event log, or hardware, such as an event logging device or adapter. The various event sources 106 will, from time to time, generate problem determination events 108. An event 108 may be used to represent a change in the state of a hardware or software component or subcomponent, processes, feature, characteristic or other aspect of the system 100 that is supported, maintained, monitored or otherwise associated with the corresponding event source 106. Events 106 may also be used to represent a change in the status of information or knowledge of the event source 102 or of devices, processes or other hardware and/or software supported, maintained, monitored or otherwise associated with a corresponding event source 106 that could impact the operation or processing of the system 100 or a subset of the system 100, or that may, in general, be of interest to someone or some process monitoring the system 100 or a subset of the system 100.

Domain experts 110 may analyze one or more events 108 and create information, designated herein as symptoms 112 and/or symptom categories 114, which are stored in one or more symptom databases 116. Domain experts may comprise a human operator, e.g., an information technology support specialist, an analyst or developer. Domain experts 110 may also comprise an automated system, including intelligent autonomous computing systems or combinations of human and automated processes. Symptoms 112, symptom categories 114 and their corresponding symptom database(s) 116, as well as exemplary taxonomies for describing symptoms 112 and symptom categories 114, will be described in greater detail below.

It is possible and likely probable, that the number of events 108 that are generated by the various event sources 106 will exceed an amount of information reasonably manageable by a human operator without some level of automated assistance. In this regard, an event monitoring tool 120 is provided, which may mine, filter, sort, hide, show and otherwise organize data associated with the events 108 into logical groupings that have an immediate and intuitive understanding by the corresponding human operator. The monitoring tool 120 assists an operator in diagnosing system problems by sharing domain knowledge generated by the domain experts 110 and which is stored in the symptoms database 116. The monitoring tool 120 further provides a mechanism to combine and visualize event and symptom data for diagnosing system problems, such as by predicting that a symptom may happen so a preventative action may be executed in order to prevent the symptom from ever happening. In addition, the monitoring tool 120 allows a visualization of those events that participate in symptoms or the problem in a proactive manner as will be described in greater detail below.

The monitoring tool 120 includes a monitor 122, an extractor 124, an analyzer 126 and a visualizer 128. The monitor 122 is provided to receive events 108 that have been communicated across the network 104 by at least one of the event sources 106. The extractor 124 provides the necessary interaction between the monitoring tool 120 and the symptoms database 116 for extracting select symptoms 112 and symptom categories 114 from the symptoms database(s) 116.

The analyzer 126 provides the necessary processing to combine select events and their associated symptoms. For example, the analyzer iteratively performs a symptom analysis comprising correlating events collected by the monitor 122 with symptoms extracted by the extractor 124, and by dynamically updating a prediction of the likelihood that ones of the extracted symptoms will occur. As will be described in greater detail below, a correlation is identified if a select event satisfies at least one predicate of an event correlation rule of the select symptom. Also, the prediction of likelihood of a given symptom is based at least upon the currently satisfied predicates of its associated event correlation rules.

The visualizer 128 allows an operator to interact visually with the events 106 received by the monitor 122 and the symptoms 112 obtained by the extractor 124. For example, the visualizer 128 may group the events that correlate with the extracted symptoms and provide a user-directed visualization of those groupings. Moreover, those visualizations may be updated, modified or otherwise distinguished as the likelihood of corresponding symptoms change. The various functions of the monitoring tool 120 will be described in greater detail below.

Each symptom 112 extracted from one or more symptoms databases 116 characterizes a symptom to a previously considered problem and represents knowledge that is presented by a domain expert and/or is mined by an autonomic symptom miner. Each symptom is recorded with at least one event correlation rule, each correlation rule having at least one predicate thereof that can be corresponded to events 108. For example, a domain expert 110, e.g., a support analyst may recognize that within the system 100, if error X occurs to component Y, then product Z may crash, fail, terminate, etc. However, the problem associated with product Z can be detected by recognizing that symptoms A, B and C are simultaneously present and correspond to the error X in component Y. As such, a solution can be identified, and/or a problem may be prevented, mitigated, compensated for or otherwise corrected if the problem and knowledge of a solution can be brought to the attention of an operator within an appropriate time. As such, the symptoms 112 may not only describes problems but further may be used to encode rules and/or provide an action to achieve solutions that stem from or relate to the current "symptom" or pattern that corresponds with a root cause problem.

Moreover, the symptom A may be predicated upon the occurrence of events D, E and F. As will be described in greater detail herein, the probability of the occurrence of symptom A may be predicted by identifying the occurrence of any one or more of the predicate events D, E and F. Accordingly, the occurrence of a problem associated with product Z can be predicted before symptom A fully materializes, e.g., by determining that one or more of the predicates has been satisfied.

As such, a support person with little knowledge of the root cause of a problem may be able to sort through (potentially thousands or hundreds of thousands of) events and figure out not only the problem (product Z may crash), but also a solution to the problem by utilizing the analyzer tool 126 to collect and correlate incoming events against the known symptoms A, B, C.

According to one aspect of the present invention, the analysis of events 108 may be standardized and shared among domain experts 110 who have obtained experience and/or expertise with regard to root cause problems of a select event or events by using the symptoms database 116. Various aspects of the present invention also enable the association of similar symptoms 112 into symptom categories 114. Thus a whole taxonomy of symptoms 110 leading to similar problems may be created. In this regard, it is often the case that the solutions to similar problems are often similar themselves.

Figure 2:
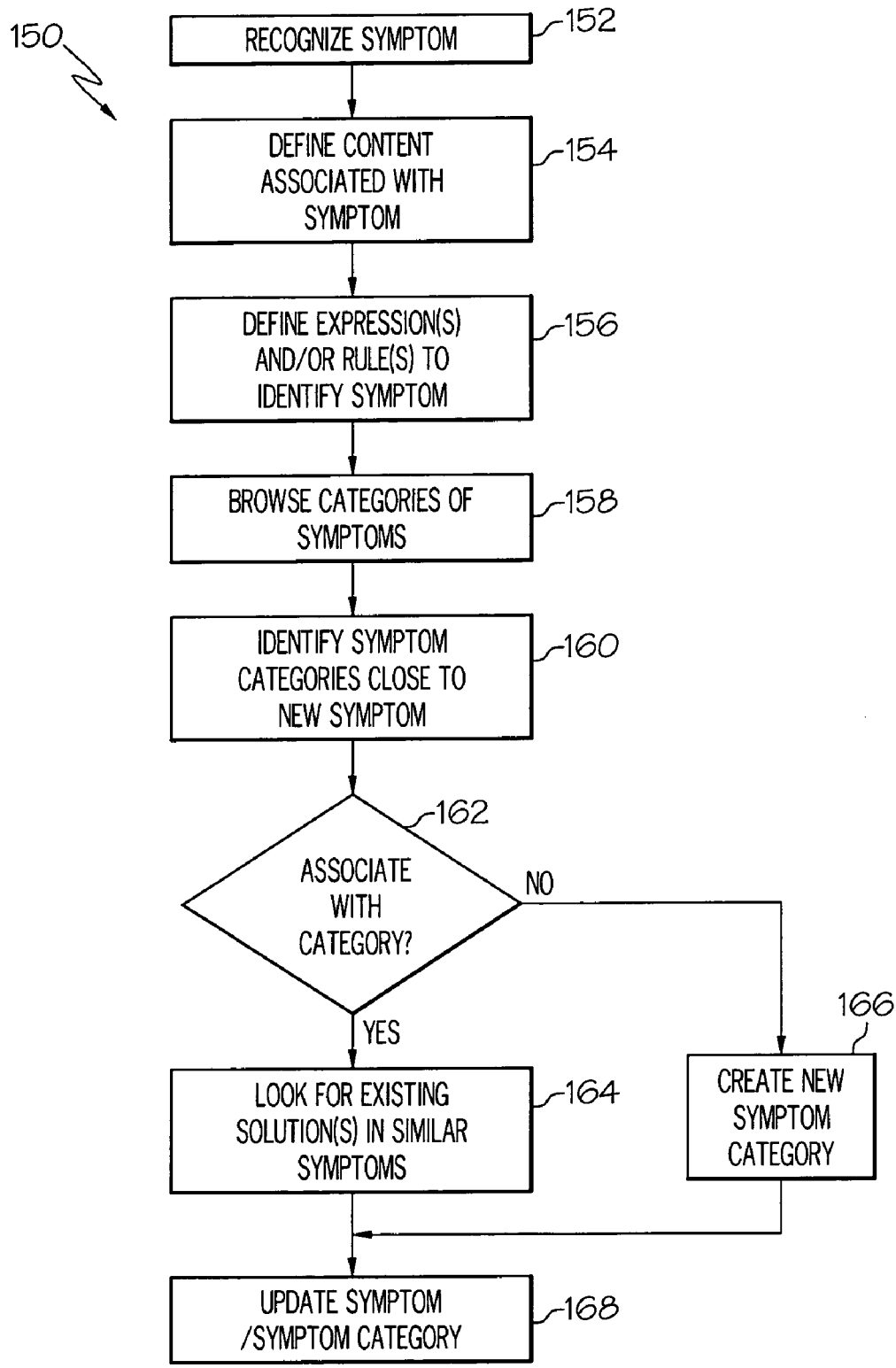
FIG. 2 is a flow chart illustrating a method of populating a symptoms database illustrated in FIG. 1.

Referring to FIG. 2, a method 150 illustrates an exemplary approach for populating the symptoms 112 and/or symptom categories 114 stored in the symptoms database(s) 116. A new symptom is recognized at 152. This may be accomplished, for example, by domain experts 110 that are analyzing problems, speculating about likely or possible problems, or from the general knowledge of one or more of the domain experts. Recognition of a symptom may also occur during analysis of event data, e.g., while interacting with the monitoring tool 120 shown in FIG. 1. A symptom may also be recognized at 152 by retrieving an existing symptom for editing.

Upon recognizing a symptom at 152, a domain expert defines and/or edits content associated with the recognized symptom at 154. The defined content represents the domain experts knowledge of the symptom, which is to be shared via the symptoms database(s) 116. The domain expert also defines one or more event correlation rules to identify the symptom at 156 so that the knowledge of the domain expert creating the symptom record can be located and shared with other domain experts and monitoring tools as noted above. The event correlation rules may in practice, comprise one or more expressions and/or rules.

The symptom categories 114 currently stored in the symptoms database(s) 116 may be browsed, searched or otherwise examined at 158, to identify at 160 whether a symptom category 114 can be associated with, is related to, or is otherwise close to the new symptom (or to a symptom being edited by a domain expert). If a decision is made at 162 that the new symptom can be associated with an identified symptom category 114, then the existing symptoms 112 in the symptoms category 114 may be analyzed to determine whether existing solutions to similar problems from the same symptoms category can be applied to update the content of the new symptom at 164.

If the new symptom cannot be associated with a symptom category 114 in the symptoms database(s) at 162, a new symptom category 114 may optionally be created at 166, which is associated with one or more symptoms recognized at 152. The new or edited symptom record is updated with the additional information at 168, e.g., by depositing the symptom and updated and/or new category information into the symptoms database(s) 116. The updating of symptom records may occur at any time during implementation of the various aspects of the present invention. Thus, the symptoms database(s) 116 may be dynamically updated by a domain expert, even during operation of the monitoring tool 120. In turn, updates to the symptoms database(s) 116 may be utilized to modify action of the analyzer 126 and visualizer 128 during execution thereof.

Different domain experts may have different views, knowledge and understanding. As such, different domain experts may determine that different symptoms are indicative of a given root cause problem. As such, the interaction of domain experts and the symptoms database may continually provide updated, modified and expanded information.

Figure 3:
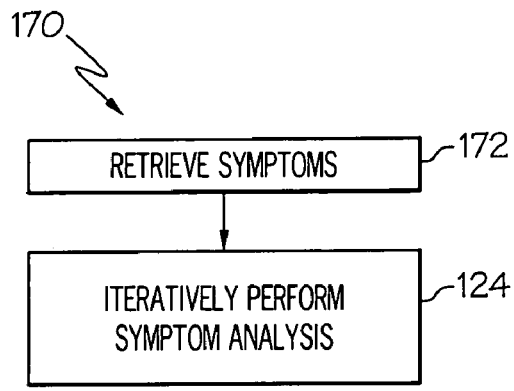
FIG. 3 is a flow chart illustrating a method of identifying a root cause of a problem in the computer system illustrated in FIG. 1.

With reference to FIGS. 1 and 3 generally, an exemplary method 170 of selecting data that participate in symptoms of root cause problems within the system of FIG. 1 is illustrated. Symptoms from a symptoms database are provided at 172 and a symptoms analysis is iteratively performed at 174.

Figure 4:
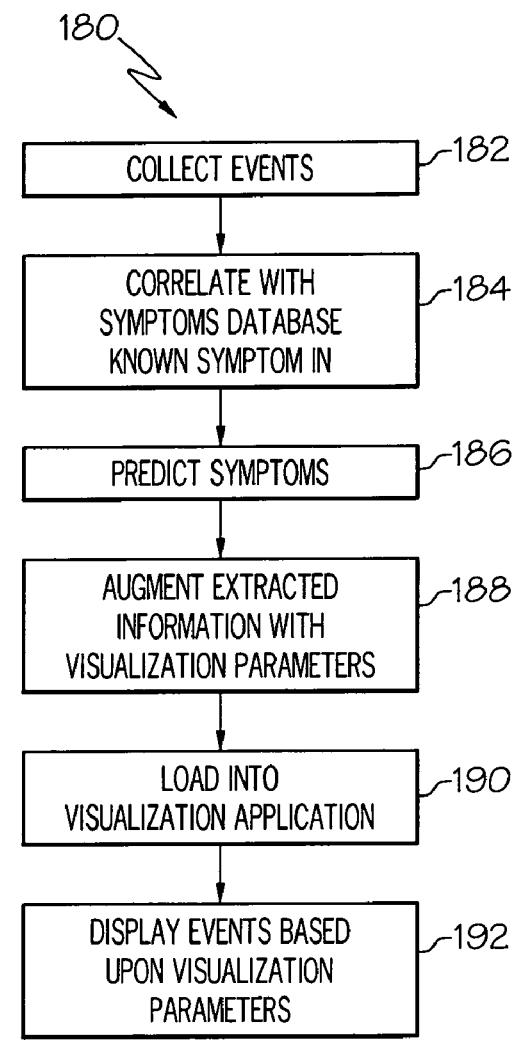
FIG. 4 is a flow chart illustrating one exemplary method of making domain expert information available to an operator.

Referring to FIG. 4, one exemplary method 180 of implementing the iterative analysis at 174 of FIG. 3 comprises collecting events from one or more event sources at 182 and correlating the collected events with symptoms at 184. An event participates with a symptom if that event satisfies at least one predicate of an event correlation rule associated with the symptom. Thus, a correlation is satisfied even if a partial match to a correlation rule is satisfied. For example, an attribute of the event may be matched at least partially with one or more or the extracted symptoms from the symptoms database. Correspondingly, the events, or attributes of the events are associated with corresponding types of symptoms. A prediction of the likelihood that select symptoms will occur is performed at 186 based at least upon current predicates of the event correlation rules of the select symptoms that are satisfied by said collected events.

There are a number of ways to implement the correlation of events with symptoms for root cause problem analysis. For example, if a particular root cause problem is being investigated, the symptoms of that particular problem may be extracted from the corresponding symptoms database(s)

116 and the analysis may focus on events that are predicates of the associated symptoms. Under this arrangement, the symptoms may be extracted at as a preliminary step to the iterative analysis performed at 174. Alternatively, symptoms may be read out from the symptoms database upon the detection or selection of events that have occurred. Thus, the symptoms database(s) may be accessed at as part of the iterative analysis.

The information extracted from a symptom, which corresponds to an associated event may be augmented with visualization parameters at 188, and information, including the visualization parameters, may be loaded into the visualization application, (e.g., the visualizer 128) of FIG. 1 at 190. The visualization application may then display events based upon the visualization parameters at 192. The visualization attributes may include, for example, a color, color gradient or other color scheme, or other indicia that uniquely identify the data that is displayed, e.g., in an event or other visually organized presentation. For example, the visualizer 128 shown in FIG. 1 may group events that correlate with select symptoms and provide a user-directed visualization of those groupings. Further, the content of those symptoms may include description and recommendation information that may be presented to the user.

Figure 5:
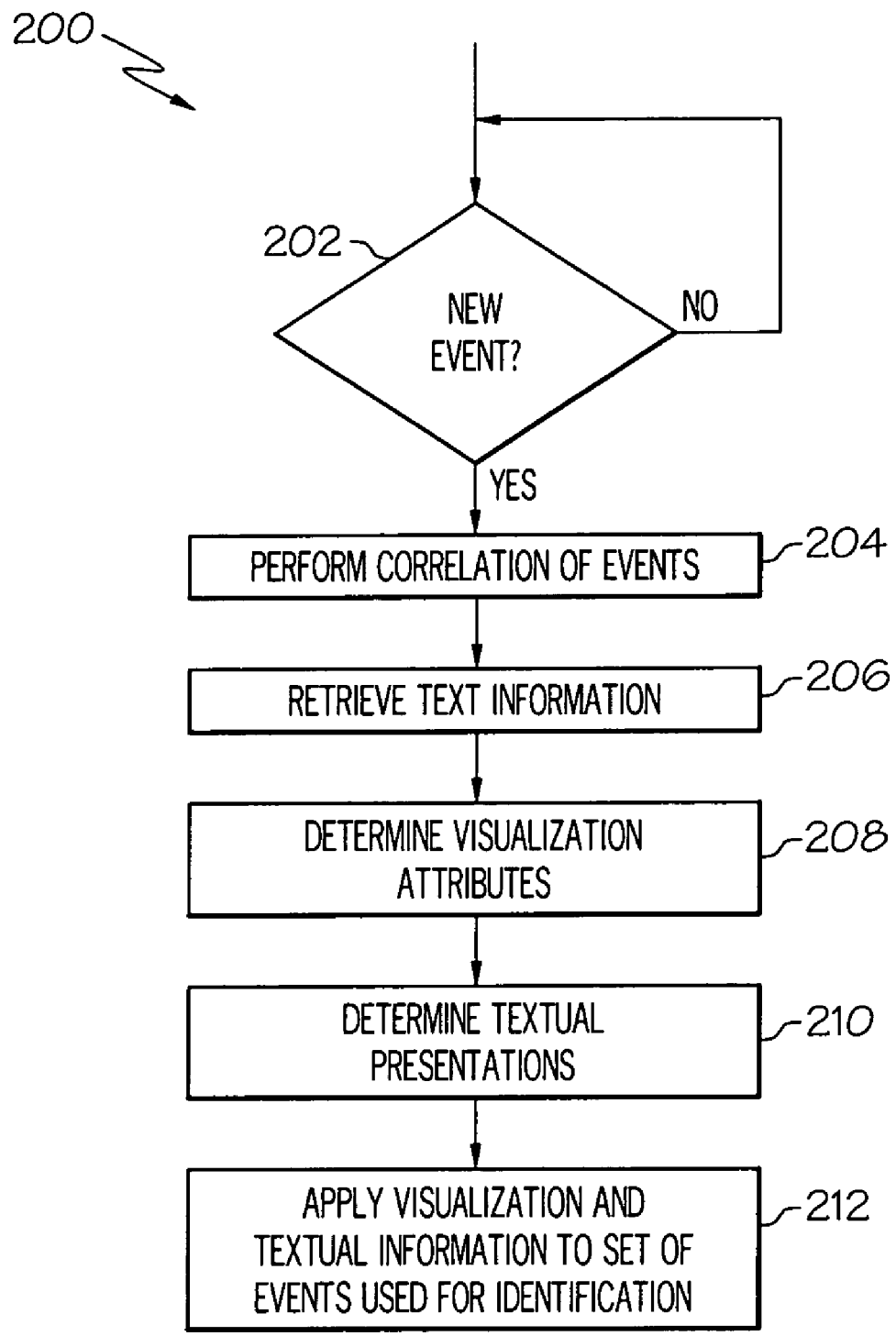
FIG. 5 is a flow chart illustrating a specific exemplary method of monitoring events based upon the method illustrated in FIG. 4.

One exemplary method of implementing the monitoring of events is illustrated in greater detail with reference to FIG. 5. A method 200 comprises detecting a new event at 202. If an event has arrived, the system performs a correlation of events at 204. The correlation may be performed automatically, and is utilized to identify which symptoms, e.g., from one or more symptoms previously extracted from the symptoms databases or from symptoms located in the symptoms database(s), that are associated with the new event(s). Corresponding events are matched with their associated symptoms. In this regard, the matching of an event with a symptom may be a partial match. For example, the new event may match only part of an expression or satisfy a single predicate of a rule in the corresponding correlation rules. Partial matching may be used by the system for visualization of symptoms before they are complete, and is thus useful for the prevention of problems, even before they occur by predicting the likelihood of the symptom occurring.

After the new event is matched with one or more symptoms, textual information is retrieved from the matched symptoms, and optionally from the corresponding symptom category at 206. Visualization attributes associated with the symptom and symptom category are determined at 208 and textual presentations associated with the symptom and symptom category, for example descriptions, are determined at 210. The visualization and textual information are applied to the set of events used for identification at 212.

Figure 6:
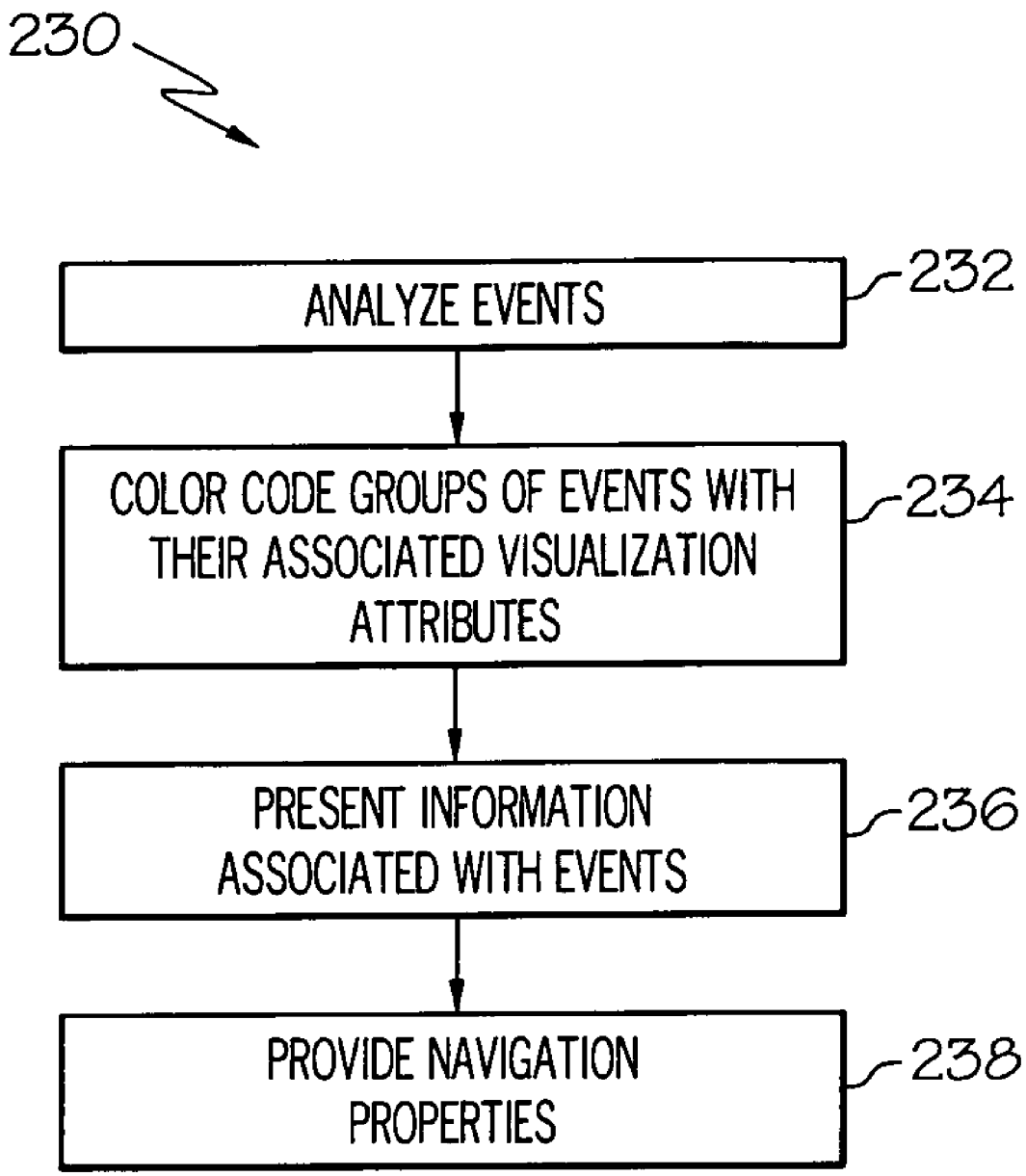
FIG. 6 is a flow chart illustrating a specific exemplary method of analyzing events, symptoms and symptom categories based upon the method illustrated in FIG. 4.

With reference to FIG. 6, an exemplary method 230 of presenting events is illustrated. The analysis of events at 232 comprises associating attributes of symptoms and symptom categories so that symptom and event information can be represented visually and uniquely. For example, each symptom record may include one or more visualization attributes. The system may utilize color-coding of groups of events with their associated visualization attributes at 234. The system presents information associated to each event at 236. For example, hovering capability may be implemented, wherein a mouse is hovered over an event to cause the system to display additional information. Detail panels and/or extra panels in the event are further examples. The system further provides navigation properties such that a user may locate all events associated with a given symptom in the screen at 238, for example, by supporting back and forth links.

Referring back to FIG. 1, the visualizer 128 may present information to the operator by representing select data associated with different symptom categories 114 in unique base colors, and symptoms 112 of the displayed symptom categories 114 in varying gradations of the corresponding base color. For example, it is useful information to an operator visualizing a list of monitored events to know that two different sets of events are similar and/or have similar solutions, as quickly evidenced by their color and/or shading. Such observations may often signal that further root cause analysis can be performed and a new, straight forward solution may be found. Also, two different symptoms 112 that belong to the same symptom category 114 could have their sets of events presented in shades of a same color. The operator examining theses two sets will know immediately that the two sets belong to the same category and may be caused by a common situation. Such an occurrence might even indicate that their resolution should be handled together, thus saving time.

Moreover, each problem definition that an operator addresses may have associated attributes so that information, including symptoms 112 and symptom categories 114, can be further represented visually and uniquely, e.g., by utilizing visual indicators including customized indicia, customized fonts, highlighter functions, tooltip functions, etc.

The color-coding may be applied to displayed events to provide a visually intuitive and readily recognizable approach to representing problematic events detected in the system 100. For example, operators can associate colored parts of their display with real problems immediately, without further drilling down and analyzing information associated with an event. Further, color coding may be utilized to create patterns in the data, e.g., patterns of symptoms 110 that may suggest a root cause problem, even before all such symptoms 110 are fully realized. The monitoring tool 120 will be described in greater detail below.

Figure 7:
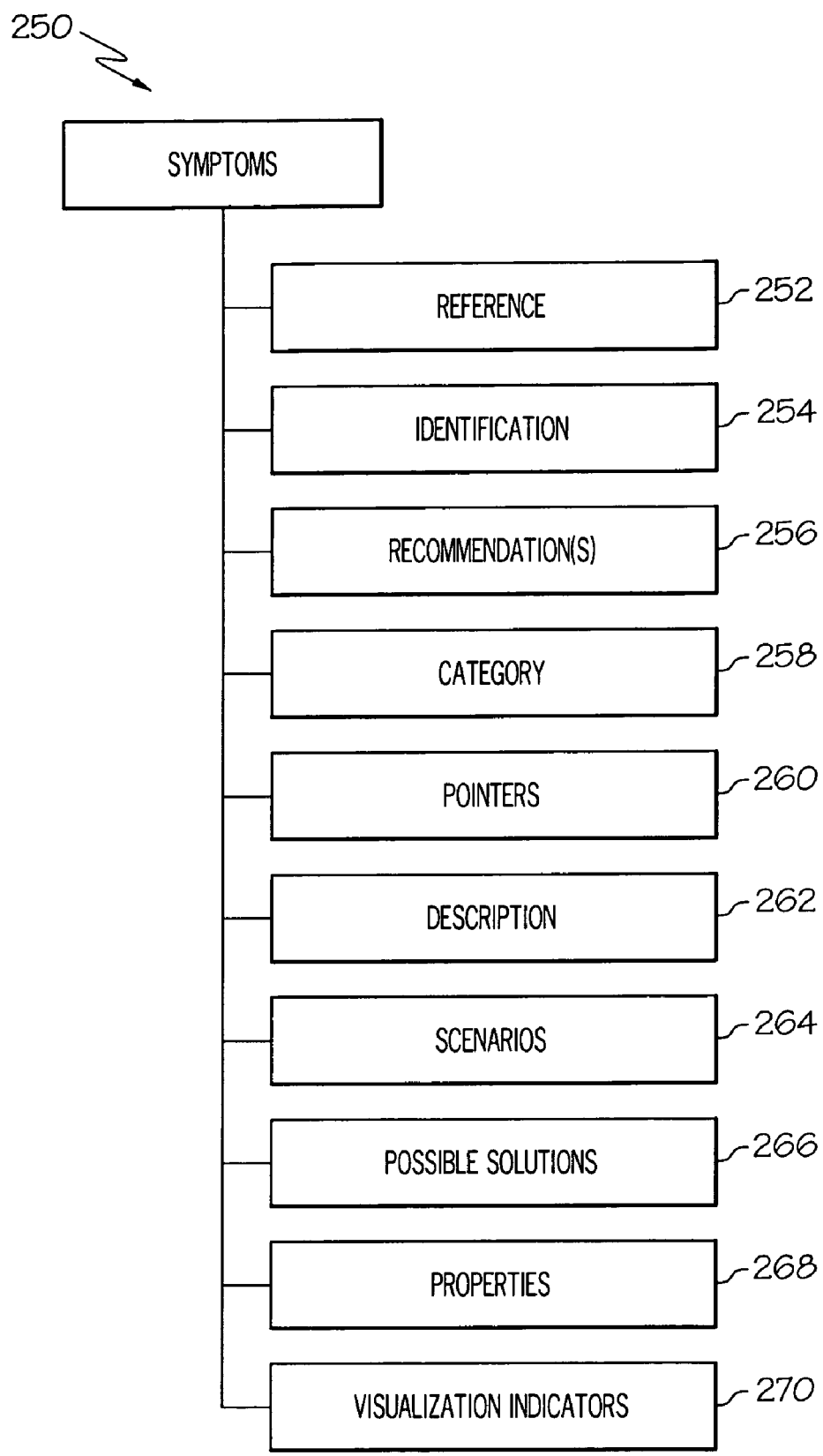
FIG. 7 illustrates an exemplary schema for a symptoms record.

In general, symptoms 112 correspond to events or collections of events and their associated root cause. Each symptom 112 may include explanations, samples and solutions that identify an action or actions to be performed in order to resolve the underlying problem(s). Symptoms 112 allow domain experts 110 to share knowledge so that future events may be responded to in an efficient manner. With reference to FIG. 7, in one exemplary implementation of various aspects of the present invention, symptoms 112 are stored in the symptoms database(s) 116 in the form of symptoms records 250. An exemplary schema for each symptom record 250 comprises a reference field 252, one or more correlation rules fields 254, one or more recommendation fields 206, a category field 208, one or more pointers fields 210, a description field 212, one or more example fields 214, one or more solutions fields 216, one or more properties or attributes 218 and one or more visualization fields 220. The reference field 252 defines a reference to the symptoms database that defines the current symptom and may be used, for example, for updating and/or subscription purposes. The rules field 254 defines a set of rules or other methods for identification. The rules field 254 may also define event correlation rules. The recommendations fields 256 define recommendations or actions that should be executed to resolve the problem associated with the symptom. The category field 258 organizes groups of symptoms in a taxonomy.

The pointers field 260 defines a set of pointers to associated symptoms that belong to the same symptom category, and may be utilized for consultation purposes. The description field 262 is a textual description of what the symptom is. The examples fields 264 may be used to provide a textual set of examples or scenarios associated to the present symptom. The solutions fields 216 define textual descriptions of possible solutions that resolve the scenarios described in the examples fields 264. The properties fields 268 define a collection of ancillary properties and attributes that are associated to symptoms processing and management. Exemplary properties may include for example, probability factors, priority indicators etc. The visualization indicators fields 270 define extra visualization indicators that will help present symptoms to human operators, including a color-coding shading index, such as a gradation index that represents a color gradient on a percentage basis 0%-100%.

Figure 8:
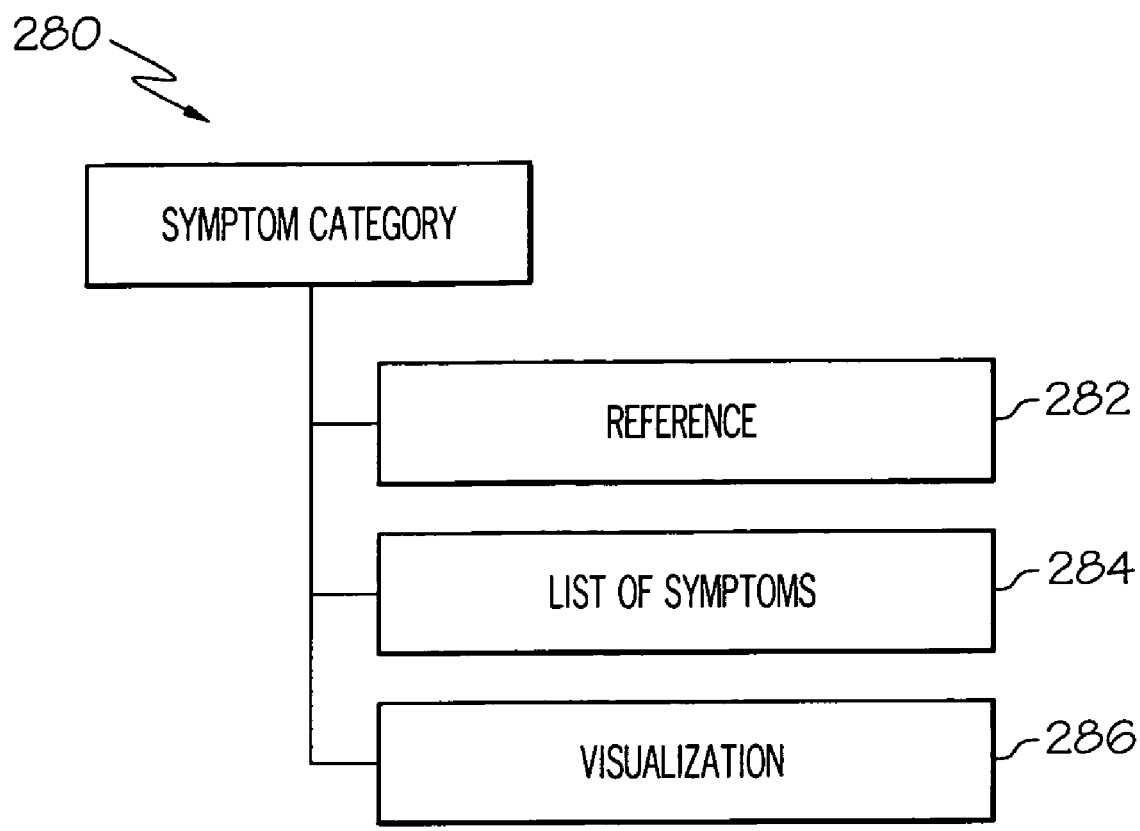
FIG. 8 illustrates an exemplary schema for a symptoms category record.

With reference back to FIG. 1, symptom categories 114 may also be stored in the symptoms database(s) 116. The symptoms categories 114 are groups or classes of related or otherwise associated symptoms 112. An exemplary schema for storing symptom categories 114 is illustrated in FIG. 8. With reference thereto, symptom categories 114 are represented by symptom category records 280. An exemplary schema for the symptom category records 280 comprises a reference field 282, a symptoms field 284 and a visualizations indicator 286. The reference field 282 defines a reference to the symptom database that defines the current symptom category in a manner similar to reference field 252 of the symptom record 250 described with reference to FIG. 7. The symptoms field 284 defines a list of symptoms that are part of the category record 280. The visualization indicator 286 defies extra visualization indicators that will help present the symptom category to human operators, such as a color-coding, such as primary, secondary, tertiary, etc.

The symptom database 116 implements a method of sharing data with event monitoring applications. One exemplary approach to describing and defining a symptom in the context of an autonomic computing knowledge network is set forth in the following partial pseudo-code. An autonomic system is in general, a system that may be capable of at least some degree of self management, and may represent a conceptual shift in paradigm from a view towards computational power to a view towards data and the sharing of data.

```
<ack:knowledgeRepository  xmlns:acc"http://www.ibm-
.com/autonomic/capability"
    xmlns:ack="http://www.ibm.com/autonomic/knowledge"
    xmlns:xsi="http://www.w3.org/2001/XMLSchema-in-
stance"
    xsi:schemaLocation="  http://www.ibm.com/autonomic/
knowledge knowledge.xsd
http://www.ibm.com/autonomic/capability capability.xsd">
    <metadata>
    <identification name="WAS Symptoms"
    uuid="KS000000000000000000000000000001"
/>
    <versioning><change author="map" comment="initial
version"
    timestamp="2001-12-31 T12:00:00" version="1.0"/></
versioning>
    <annotation description= This Ksource contains all symp-
toms for WAS problem determination" />
    <location url="http://www.ibm.com/autonomic/ksources/
was" />
    </metadata>
    <acr:manageableResourceType xmlns:acc=
    "http://www.ibm.com/autonomic/capability"
    xmlns:acr-http://www.ibm.com/autonomic/re-
        source"xmlns:xsi="
    http://www.w3.org/2001/XMLSchema-Instance
    xsi:schemaLocation="http://www.ibm.com/autonomic/
resource resource.xsd
    http://www.ibm.com/autonomic/capability    capabili-
ty.xsd">
    <identification name= Application
    Server:com.ibm.ejs.J2c.ConnectionManager"
    uuid=" RE0000000000000000000000000000001"/>
    <versioning><change author="map" comment="initial
        version"
    timestamp="2001-12-31 T12:00:00" version="1.0"/></
versioning>
    <annotation description="This resource represents the
        ConnectionManager WAS instance"/>
    <location url =
    "http://www.ibm.com/autonomic/resourc/was/conm-
gr_instance" />
    </acr.manageableResourceType>
    <ack:kElement>
    <metadata type"symptom" category= ResourceAlloca-
tion">
    <identification
name="ConnectionPoolResourceAllocationProblem"
    uuid="KE00000000000000000001" />
    <versioning>(<change author="map" comment="initial
        version"
    tilmestamp="2001-12-31 T12:00:00" version=1.0"/></
versioning>
    <annotation description="The Connection Pool Manager
could not allocate a Managed Connection" />
    <scope>
        <resource>RE000000000000000000000000       </re-
            source>
    </scope>
    </metadata>
    <schema>KS00000000000000000000000000000001
</schema>
    <definition>KD00000000000000000000000000000001
</definition>
    <effect>KF00000000000000000000000000001 </effect>
    <engine>KC00000000000000000000000000000001 </en-
gine>
    </ack:kElement>
    <ack:kSchema>
    <identification name="was_resource_allocation"
    uuid="KS00000000000000000000000001" />
    <versioning><change author="map comment="initial
        version"
    timestamp="2001-12-31    T12:00:00"    version="1.0"
/><versioning>
    <type>
        <acs:symptom description="Resource allocation prob-
            lem in WAS server"
        example="memory is full" priority=1
    probability="100" reference="
    http://www.ibm.com/autonomic/symptoms/was/was_re-
source_allocation"
        solution="increase memory or decrease load in host
            machine"
    xmlns:acs="http://www.ibm.com/autonomic/symptom"
    xmlns:xsi="http://www.w3.org/2001/XMLSchema-in-
        stance"
```

```
xsi:schemaLocation="http://www.ibm.com/autonomic/
   symptom symptom.xsd" />
   </type>
</ack:kSchema>
<ack:kDefinition>
<identification
name="check_for_was_resource_allocation"
   uuid="KD000000000000000000000000000001" />
<versioning><change author="map" comment= "initial
   version"
timestamp="2001-12-31 T12:00:00" version="1.0" /></
versioning>
   <type>
   <acs:symptomDefinition expression=
   "CommonBaseEvent[extendedDataElements/
      @msgId='WMSG0019E'] and [sourceComponentId/
      @subComponent='WAS']"
      xmlns:acs=   "http://www.ibm.com/autonomic/symp-
         tomDefinition"
      xmlns:xsi=   "http://www.w3.org/2001/XMLSchema-
         instance"
      xsi:schemaLocation =
   "http://www.ibm.com/autonomic/symptomDefinition
symptomDefintion.xsd" />
   </type>
</ack:kDefinition>
<ack:kEffect>
<identification name="increase_memory" uuid=
   "KF000000000000000000000000000001"/>
<versioning><change author="map comment= initial ver-
   sion"
timestamp="2001-12-31 T12:00:00" version="1.0"/></
versioning>
   <type>
      <acr:recommendation  description=increase  the
         memory in the host machine"
      xmlns:acr="http://www.ibm.com/autonomic/recom-
         mendation
      xmlns:xsi="http://www.w3.org/2001/XMLSchema-in-
         stance"
      xsi:schemaLocation =
   http://www.ibm.com/autonomic/recommendation recom-
mendation.xsd" />
   </type>
</ack:kEffect>
</ack:knowledgeRepository>
```

The above exemplary partial pseudo-code illustrates that the autonomic computing knowledge architecture defines the content associated with a symptom as well as the expression used to identify the symptom, which is referred to as the symptom Definition. The analyzer 126 of the monitoring tool 120 can extract this information from the symptoms database 116 and augment the information with visualization parameters from the corresponding symptom 112 or symptom category 114 for use by the visualizer 128. A partial pseudo-code is presented below to illustrate one example of how the visualization information may look once symptoms 112 are loaded from the symptoms database 116 into the visualizer 128.

```
<extendedSymptom name="symptom-1">

<acs:symptom description= allocation problem in WAS
server" example=memory is full priority="1"
   probability="100"

reference="http://www.ibm.com/autonomic/symptoms/was/
was_resource_allocation"
   solution="increase memory or decrease load in host
      machine"
      xmlns:acs="http://www.ibm.com/autonomic/symptom"
      xmlns:xsi="http://www.w3.org/2001/XMLSchema-in-
         stance"
      xsi:schemaLocation="http://www.ibm.com/autonomic/
         symptom symptom.xsd" />
   <acs:symptomDefinition expression=
   "CommonBaseEvent[extendedDataElements/
      @msgId='WMSG0019E'] and [sourceComponentId/
      @subComponent='WAS']"
      xmlns:acs=   "http://www.ibm.com/autonomic/symp-
         tomDefinition"
      xmlns:xsi="http://www.w3.org/2001/XMLSchema-in-
         stance"
      xsi:schemaLocation =
   "http://www.ibm.com/autonomic/symptomDefinition
symptomDefintion.xsd" />
   <highlighter activated="true" background="0,0,128"
foreground="255,255,255"/>
</extendedSymptom>
```

In addition, multiple symptoms may be combined to identify symptom categories (more abstract definition), which are groups of related symptoms that convey similar information about a given problem.

```
<symptomCategory name= <symptomCategory-1>
   <symptoms>
      <symptom name="symptom-1"/>
      <symptom name="symptom-4"/>
   </symptoms>
   <highlighter activated="true" background="0,0, 128"
foreground="255,255,255"/>
</symptomCategory>
```

As one example, the visualizer 128 may be implemented as a Java based viewer. The visualizer 128 may be utilized to encode problem patterns to integrate event and symptom visualization for early problem detection. Moreover, the visualizer 128 may be used to dynamically annotate and display the descriptions of symptoms and possible resolutions that an event is part of. Moreover, the visualizer 128 provides incremental detection and visualization of problem patterns and symptom occurrences in the system 100, and consequent enablement of prediction and prevention possibilities before a symptom or a problem with multiple symptoms is effectively detected.

As suggested herein, various aspects of the present invention are suitable for implementation in an autonomic computing system, such as a data driven system that attempts to at least partially self maintain itself. As computing systems become more and more sophisticated, it becomes likely that events will be triggered for a wide range of occurrences, and may be presented in a widely varying degree of formats. To accommodate for the potential differences in event format, an autonomic system may use standardized event reporting. For example, event data may be structured into a plurality of categories, e.g., four or more categories. One exemplary approach categorizes event data as source, reporter, situation and context/correlation data. The source data provides the identification of the component that is affected by or experienced the situation. The reporter serves as the identification of the component that is reporting the situation, and may thus be the same as, or similar to the source category. The situation data defines properties or attributes that describe a situation, and the context/correlation data defines properties or attributes to correlate the situation with other situations.

Figure 9:
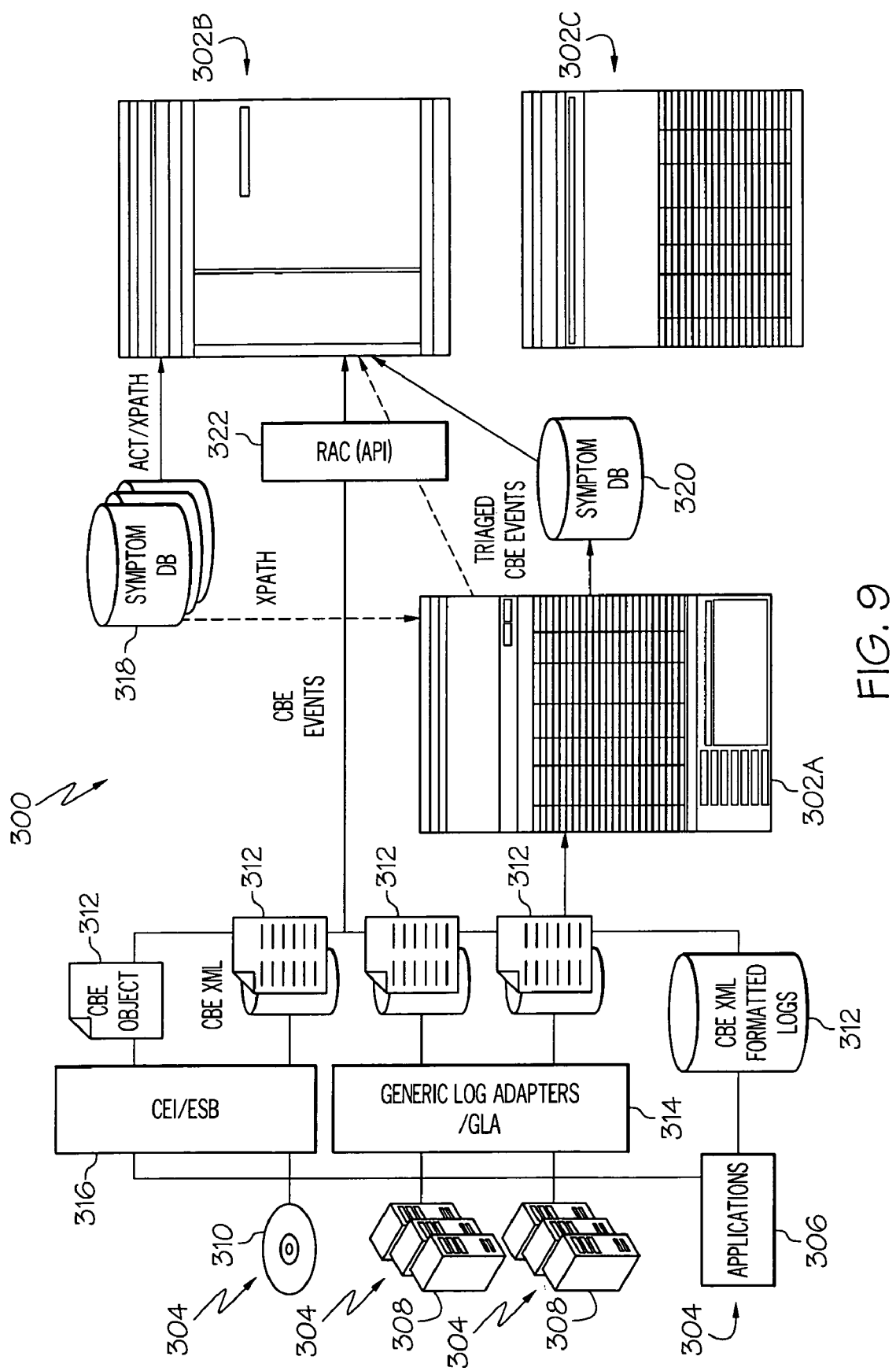
FIG. 9 is a system diagram of a system for identifying and visualizing events and symptom data in an autonomic environment.

Referring to FIG. 9, the monitoring tool 120 is illustrated in the context of an autonomic computer environment 300. In the exemplary implementation, the monitoring tool is implemented as a log and trace analyzer 302A-C for monitoring events and allowing an operator to visualize events and symptom data. The log and trace analyzer 302A-C may be implemented as an application, as a plug-in, as a web-based application, as a Java based application, etc., offering different levels of functionality and capabilities for the targeted audience, and is thus illustrated as three separate instances, as indicated by the alpha designation A, B or C following the 302 reference numeral in FIG. 9. Regardless of the particular platform or level of functionality that the software is provided, the log and trace analyzer 302A-C provides viewing, merging sorting and filtering of event and symptom data, thus comprehending the functional features of the monitor 122, the extractor 124, the analyzer 126 and the visualizer 128 illustrated with reference to FIG. 1.

The log and trace analyzer 302A-C may be further programmed to provide event correlation, single event and cross-event analysis of symptoms, remote and local data collection and event conversion, custom summary views and import and export features of filters, rules event source configuration data etc. The log and trace analyzer 302A-C may be utilized for example, by software developers, solutions integrators, testers, systems operators, system analyst and/or support engineers.

The system 300 includes a plurality of processing components 304 that include software 306, including applications, services, etc., processing devices 308, such as computers, and other devices described more fully with reference to FIG. 1, and other miscellaneous hardware 310, such as disk storage devices and stand-alone network products, e.g., printers, copiers, fax machines modems, network hubs, routers, etc. Each of the processing components 304 comprise event sources that are capable of generating events.

The software 306 may be configured such that events are either coded into or are otherwise converted into unified common base event (CBE) formatted events 312. The utilization of CBE formatted events may be desirable, for example, when utilizing autonomic management systems to implement various aspects of the present invention as the CBE events can define the structure of an event sent as the result of a situation in a consistent and common format. In one exemplary implementation, CBE events are formatted to provide the source of a corresponding situation, the reporter of the situation, situation data, properties or attributes that describe the associated situation and context properties or attributes to correlate the associated situation with other situations. The CBE log data may further be provided in the extended markup language (XML).

The event sources of the processing devices 308 utilize a generic log adapter (GLA) 314 or other appropriate sources to convert event data into CBE XML events 312. As yet a further example, the hardware 310 is illustrated as being coupled to a Common Event Infrastructure (CED 316 persisting Common Base Events (CBE) and to provide a subscription facility to forward the events 312 to the subscriber of the events. The CEI implements a consistent, unified set of application program interface (API) and a corresponding infrastructure for the creation, transmission, persistence and distribution of CBE formatted events. As another example, the hardware may couple to an enterprise service bus (ESB) or other suitable architectural pattern that unifies message oriented, event driven and service oriented approaches to integration. The CBE XML data may be provided via local data collection, via remote data collection, e.g., from a CEI server, or via other suitable means.

As illustrated, the log and trace analyzer 302A reads the CBE XML data and creates a triaged event 320 wherein events are ordered based upon their current importance for deeper analysis and correlation by other analysis/correlator engines such as the log and trace analyzer 302B-C, which are configured for performing the correlation and analysis functions.

The log and trace analyzer 302A-C retrieves and analyzes CBE log data 312 in conjunction with symptom and symptom category data from one or more symptoms databases 318 in a manner analogous to that described in greater detail with reference to the symptoms database 116. In the illustrative example, the CBE XML formatted event data can also be coupled to an instance of the log and trace analyzer 302B via a Remote Application Controller (RAC) 322 or other Application Program Interface (API) for correlation and analysis of event data.

The exchange between the various log and trace applications 302A-C and the symptoms database(s) 318 may be performed, for example, an XML path language such as Xpath, Active Correlation Technology (ACT) rule language, or other suitable technique.

Figure 10:
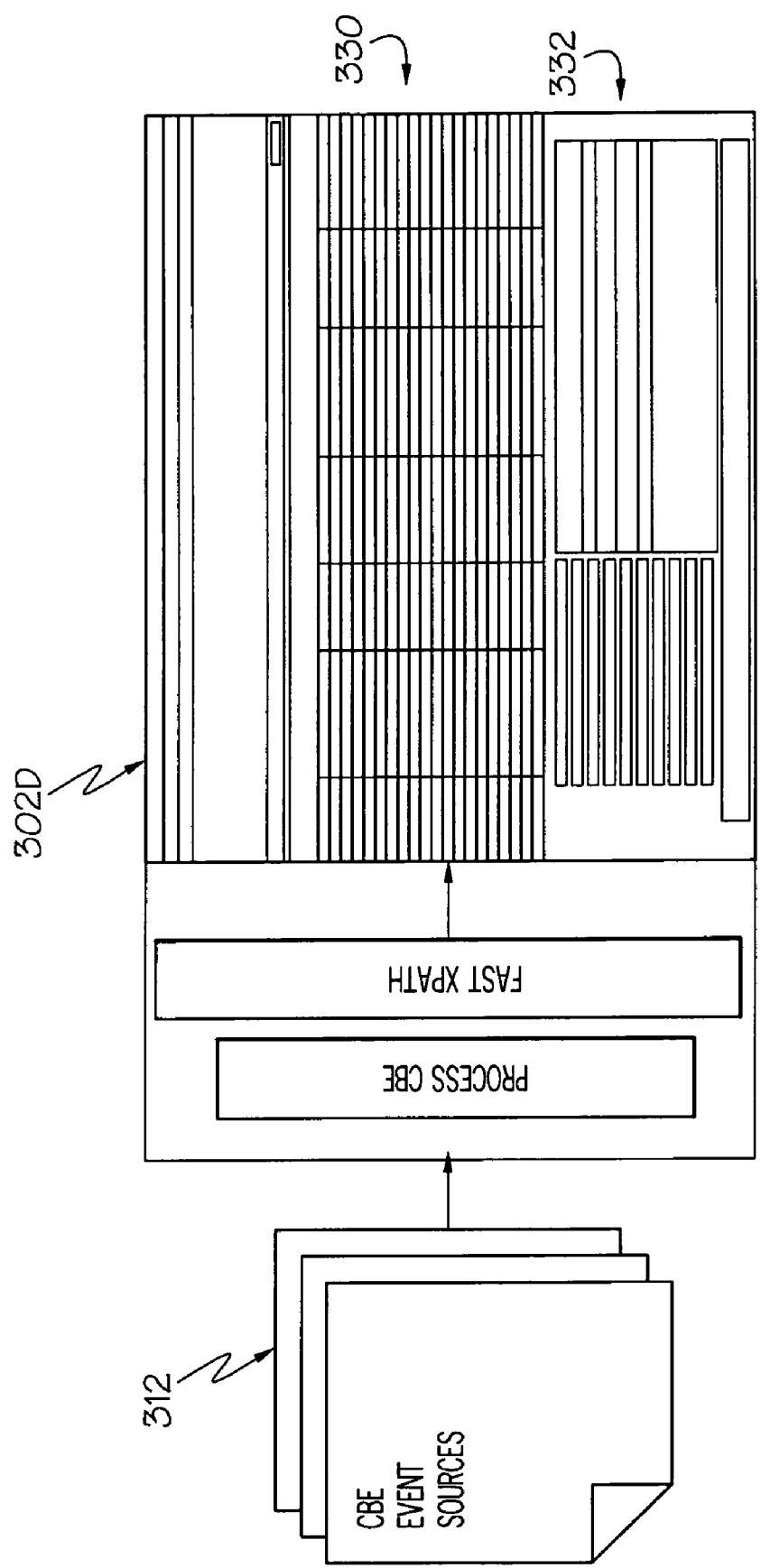
FIG. 10 is a block diagram of a system for identifying and visualizing events.

Referring to FIG. 10, an exemplary log and trace analyzer 302D is illustrated, which may be operated, for example, on Java or other suitable platforms. The illustrated log and trace analyzer 302D is a stand-alone application that assumes no other infrastructure than the Java platform. The log and trace analyzer 302D views single merged CBE events 312 from one or more event sources that are presented in CBE XML format. The log and trace analyzer 302D can correlate events on a timestamp and/or other CBE properties or attributes depending for example, upon operator preference and/or the particular type of analysis being performed.

FastXpath is utilized to process the CBE encoded event information. The FastXPath engine implements XPath language for addressing parts of an XML document, designed to be used by both XSLT and XPointer and may present a convenient solution as it integrates with existing code generating tools and can extract XML schema-specific metadata from the object it queries. However, in practice, other models may be used to present and access the event data. The log and trace analyzer 302D can correlate for example, on timestamp and/or merge event from multiple event sources and then sort on any CBE properties. In the example as illustrated, a customizable summary view 330 of event, symptom and symptom category data is provided, and the ability to select and expand any raw data from the summary view 330 to display the full CBE attributes in window 332 is further provided. Configurations may be saved for import and export in to other applications, for example, to pass triage data to another instance of the log and trace analyzer 302.

In the course of preparing event data for analysis, optional CBE preprocessing may be performed. As a few examples, the CBE event log files may be natively generated, the CBE log files may be generated by the GLA, from a CEI repository and/or from a directory containing CBE log files. CBE to XML conversion may also be performed natively, e.g., via the GLA or the API used to emit events to CEI.

As noted throughout the specification, the visualization tool allows, but is not limited to, viewing of the event data, e.g., customized viewing display of user-selected and other CBE properties, performing single and multi-level sorting on one or more properties by the even source, performing simple XPath Queries, using novice and advanced user filter builder user interfaces (UI) and compensating for time zone and formats as a few examples.

Figure 11:
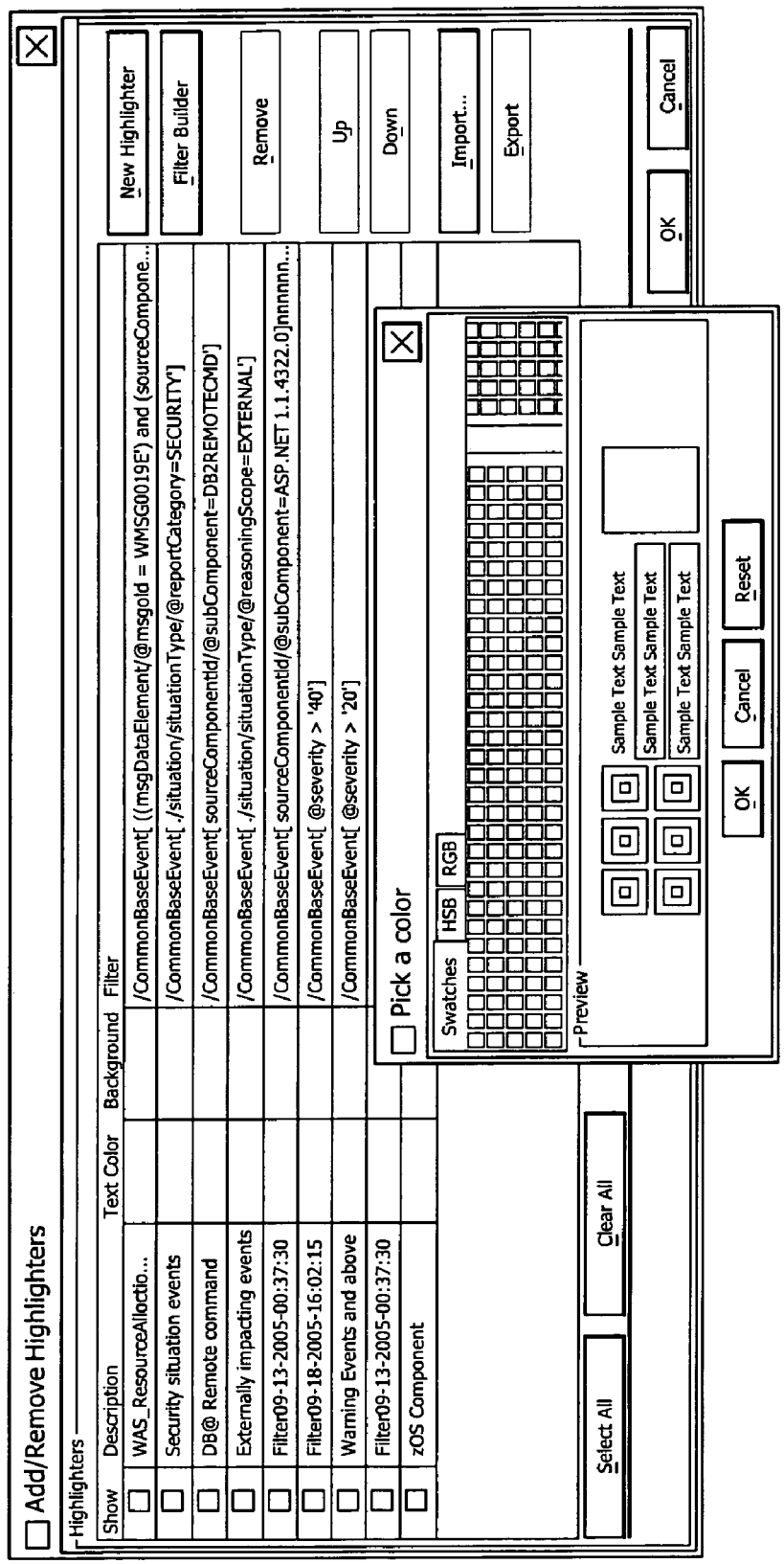
FIG. 11 is a screen shot of an exemplary interface for a simple symptom description interface.

Referring to FIG. 11, an exemplary viewing screen and interface of the log and trace analyzer 302 illustrates a configurable event highlighter, that is, simple symptoms rules, feature. The highlighter highlights a group of events based upon user-defined symptom rule criteria. The user may select from a spectrum of foreground and background colors for each selection as an enhancement to the visualization of the symptomatic events and a productivity aid for quick visualization of important events. The highlighter may be used, to detect and emphasize where problems are. For example, a system may receive over 500,000 events. The log and trace analyzer 302 may utilize user-defined filter(s) to further reduced the event set to a smaller pool, for example, 150 events, that are deemed to have occurred more relevant to the time of occurrence of problem intended to be analyzed. The highlighter, simple symptom rule, is thus applied to the detection and emphasis of symptomatic events, that is events participating in a symptom defined by the simple symptom rules, in a visually apparent manner, where problems likely are. The operator can then simply "look around" the highlighted areas, i.e., "zoom out" in the levels of detail, or "zoom in" to dive into the details of highlighted areas that strongly suggest problem areas.

As an example, assume that in the network system illustrated with reference to FIG. 1, a select one of the processing devices 102, e.g., a personal computer, cannot access a database that is hosted on a second processing device 102, e.g., a database server. A person of general knowledge of the system may surmise that the problem could be with the application requesting information from the database, the personal computer hosting the application, the database itself, the database server computer hosting the database, the communications network between the host and client computers, etc. Moreover, failed access to the database can result from a resource allocation error, full disk, database memory allocation error, a start application failure, a stop application event, a communication incompatibility, an operating system incompatibility, etc. The visualizer 128 could reduce the 500,000 events read from the system down to a handful of relevant events, which are displayed, e.g., using the highlighter (i.e., simple symptoms rules) and color-gradient tools so that the problem areas to be evaluated by the monitoring tool 120 are immediate and obvious. However, other attributes may be utilized to indicate groups of symptoms.

Various aspects of the present invention provide a mechanism to identify the possibility of the occurrence of problems by dynamically providing visual feedback (e.g., by visually changing a color scheme) to predict the likelihood of a symptom as more of the predicates of the correlation rules of that symptom are satisfied. For example, assume that four predicates A, B, C, D are required to satisfy a correlation rule of symptom E. If a detected event F corresponds to predicate A, then a predicted likelihood that symptom E may occur could be set to 25%. If a detected event G corresponds with predicate B, then the predicted likelihood can be increased to 50%. If a detected event H corresponds with predicate C, then the predicted likelihood can be increased to 75%. Finally, if a detected event I corresponds with predicate D, then the predicted likelihood is now 100%. Thus the system can refresh itself to update predicted likelihood data based upon changes in the status of events.

Other techniques may alternatively be used, such as by assigning weights or different percentages to different predicates, etc. Moreover, the events corresponding to predicates need not occur in a predefined order unless necessary to the specific rule. Still further, a given event may satisfy a predicate of more than one symptom. As the likelihood of the symptom changes, due to changes in the predicates of a correlation rule that have been satisfied, corresponding visualization information may be updated, such as by changing color gradient, or providing a different visual indication. By providing solution information in the symptom database, the user is provided the ability to proactively and dynamically identify the likelihood that symptom E may occur, and to take preventative measures based upon previously determined domain expert knowledge before all of the predicates of the symptom have materialized.

As noted in the discussion above, each symptom 112 may have a ranking attribute such as a weight or other like attribute associated therewith. Moreover, each symptom may have an initial value associated with it. The provision of at least one ranking attribute allows the system to respond in a pre-emptive manner by automatically managing the importance or ranking of symptom and event data that is visualized. For example, ranking may be utilized to visualize predicted severity or priority, even in symptoms whose predicates have not been completely satisfied.

One exemplary ranking attribute is a weight attribute that can be utilized to define a weighting scheme that allows a ready implementation of the system to accommodate relatively complex and varied scenarios. For example, as noted above, a single root cause may have associated therewith, numerous symptoms. Moreover, a symptom may be associated with multiple root causes, and an event 108 may correspond to several symptoms. The weights and initial values provide a mechanism that allows the visualizer 128 to alert the operator of event and symptom data based upon a weighted importance. Thus, changes in participation of events in multi-symptom patterns can be dynamically updated based at least upon the weight attribute. In this regard, the weights and initial conditions may be different for different implementations, depending upon the needs, priorities and capabilities of the specific implementation of the system 100.

Also, the weights and initial values may be adjusted along with the correlation rules and other aspects of the symptoms by the domain experts on the fly as the domain expert interacts with the event data. Thus, the domain expert can dynamically build correlation rules and otherwise modify symptom information.

Still further, the dynamics of the system allow weights and visual presentation of event, symptom and root cause problems to change during execution. For example, the detection of a new event may affect the likelihood of one or more symptoms, which may itself affect the likelihood of one or more root causes. This may in turn, affect the determination of severity or priority of one or more symptoms or root cause problems which may cause an adjustment to a ranking attribute such as an assigned weight attribute.

As an example, a low priority symptom, or a symptom that identifies a root cause having nominal or no consequence may be coded with yellow, or another color choice. A symptom that identifies a critical problem can be coded with a red color choice, or other color code that is understood to mean an increased severity and/or urgency is required for a specific problem. The weights may be used to flag the most severe, critical or important symptom, despite the observation that only part of the required information is available to make a complete diagnosis of the root cause of the problem. As such, the system may implement a rule that asserts that the most important/weighted symptom is visualized. Moreover, the density, i.e., the gradient of the color may be established to represent a varying degree within a given category. For example, it may be understood that as a color visualization becomes darker, e.g., closer to 100% saturation or gradient level, the more sever the problem is or the greater the likelihood that a particular symptom will occur. In another example an event that has already matched the rule of a symptom and has taken the attribute of that symptom, for example color, may take the characteristics of a new symptom if it matches the rule of that new symptom and that symptom has a higher priority and/or probability.

It should be understood that the utilization of a color scheme is described because its implementation typically results in a visual presentation with an immediate and clear presentation of the data. As an alternative to a color scheme, other indicia including symbols, markings and other visual references may be utilized e.g., small icons, a number within a predefined range, etc. Thus, the system may pick up on the highest importance that a given event participates in a corresponding symptom. For example, symptomatic events that may participate in more than one symptom definition may change their attribute, such as highlighted color to indicate potential occurrence of a symptom of a problem with a weight or probability of higher level. For example, a yellow highlighted event indicating a relatively non severe problem may turn to a highlighting color of a symptom of a higher severity, if it matches that symptom's rules.

It should be understood that the utilization of a color scheme is described because its implementation typically results in a visual presentation with an immediate and clear presentation of the data. As an alternative to a color scheme, other indicia including symbols, markings and other visual references may be utilized, e.g., small icons, a number within a predefined range, etc. Thus, the system may pick up on the highest importance that a given event participates in a corresponding symptom. For example, symptomatic events that may participate in more than one symptom definitions may change their attribute; for example, highlighted color to indicate potential occurrence of a symptom of a problem with a weight or probability of higher level. For example, a yellow highlighted events indicating a relatively not sever problem may turn to highlighting color of a symptom of higher severity, if it matches that symptom rules.

Going back to the previous example, assume a database is not responding. This could occur as a result of the database running out of allocated table space, or a queue for buffering table entries could be out of queue space. To an application that takes orders or information, the table size may be important. However, if the queue is exceeded, new orders cannot be received. As such, under this simplified example, a symptom related to the queue may signify a relatively important problem. As such, a symptom pointing to the queue may be assigned a relatively high weight and may be color coded red, to indicate an immediate response is required. The table space symptom is still serious, but maybe a little less so than the queue in the current example, because the queue can continue to accept orders. As such, the table space symptom may be given a relatively lower weight and may be color coded pink or a different gradation of a base-color red to indicate a slightly less serious symptom.

As another example, given the same database and database errors above, assume that the application is to display current stock items available for sale over the internet. Under this arrangement, the table space symptom may be more important to the queue, because it may be more desirable to keep the view of the current database contents up for viewing, than to display the queued items. As such, the queue symptom may be color coded pink and the table space symptom may be color coded red. As noted above, other meaningful indicia, including visual audible or other signaling features may be utilized to differentiate the importance of the symptoms.

In practice, the system can get extremely complex. As such, the visualization can dynamically update, e.g., in real time or in near real time, to account for changing events that affect the rules or decision making based upon corresponding symptoms. For example, as additional events come to the attention of the monitoring tool, certain symptoms may be ruled out as viable relevant diagnosis, while the likelihood of other corresponding symptoms may become more likely or less likely. Under this arrangement, the gradations of the display (or other indicia) may be updated to assist the operator in diagnosing the root cause of the problem.

The system further allows a user to zoom in and zoom out of a view. For example, there may be 1,000,000 events currently being considered by the monitoring tool. The ability to zoom in and zoom out allows an operator to see not only events with symptoms, but to zoom out and see "neighboring" symptoms/events. As such, the operator may be able to deduce problems by a quick perusal of a set of symptoms, and a zoomed out broad view of other areas of the system 100. Without throwing away data or sacrificing information, the level of detail can be variably adjusted. For example, an operator may only desire to see red events/symptoms. As such, the visualizer "zooms in" on the red events. By zooming out, the operator sees "around" the problem.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

As will be appreciated by one of skill in the art, the various aspects of the present invention may be embodied as a method, system, or computer program product. Moreover, the various aspects of the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate, or transport the program for use by or in connection with an instruction execution system of a corresponding processing device. The computer readable medium may comprise, for example, an electronic, magnetic, optical, electromagnetic, infrared, or semiconductor system, apparatus, device, or propagation medium. More specific examples of the computer-readable medium include an electrical connection having one or more wires, swappable intermediate storage mediums, which may include for example, floppy drives, tape drives, a portable computer diskette, a magnetic storage device, a hard disk, a random access memory (RAM), a read-only memory (ROM), an erasable programmable read-only memory (EPROM or Flash memory), an optical fiber, a portable compact disc (CD-ROM) or digital video disk (DVD), an optical storage device, or a transmission media such as those supporting wired or wireless connections to the Internet, an intranet or other network.

Moreover, the computer readable medium includes a carrier wave or a carrier signal as may be transmitted by a computer server including internets, extranets, intranets, world wide web, ftp location or other service that may broadcast, unicast or otherwise communicate an embodiment of the present invention. The various embodiments of the present invention may be stored together or distributed, either spatially or temporally across one or more devices.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN) or other network connection. For example, the connection may be made to an external computer, such as through the Internet using an Internet Service Provider.

The various aspects of the present invention are described herein with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of identifying data that participate in symptoms of root cause problems in a computer system comprising:
    providing symptoms in a symptoms database, wherein each of said symptoms relates to at least one associated root cause problem and comprises at least one event correlation rule, each correlation rule having at least one predicate thereof; and iteratively performing a symptom analysis comprising:
  collecting new events from at least one event source to be considered by said symptom analysis;
  correlating said collected events with said symptoms, wherein a select event participates with a select symptom if said select event satisfies at least one predicate of an associated event correlation rule of said select symptom;
  dynamically updating a prediction of the likelihood that ones of said select symptoms will occur based at least upon current predicates of said event correlation rules of said select symptoms that are satisfied by said collected events; and
  conveying information corresponding to said prediction of the likelihood that ones of said select symptoms will occur.

2. The method according to claim 1, wherein said symptoms further comprise a description of said symptom and a recommendation of action, and said method further comprises:
  grouping said events that correlate with said ones of said select symptoms;
  providing a user-directed visualization of said groupings; and
  selectively presenting said description and recommendation information.

3. The method according to claim 2, wherein said symptoms further comprise at least one visualization attribute, said method further comprising presenting said groupings of said events based upon said at least one visualization attribute corresponding to ones of said select symptoms.

4. The method according to claim 2, further comprising:
  retrieving symptom categories associated with ones of said select symptoms; and
  associating unique visualization information for each retrieved symptom category; wherein:
  providing a user-directed visualization of said groupings further comprises providing a user-directed visualization of said symptom categories based upon said associated visualization information.

5. The method according to claim 1, wherein said symptoms further comprise a weight attribute, and said method further comprises:
  dynamically updating changes in participation of events in multi-symptom patterns based at least upon said weight attribute.

6. The method according to claim 5, wherein said symptoms further comprise a visualization attribute, description information and recommendation information:
  said method further comprising:
    grouping said events that correlate with said ones of said select symptoms;
    providing a user-directed visualization of said groupings based at least upon said visualization attribute and said weight attribute; and
    selectively presenting said description and recommendation information associated with at least one of an operator-selected event, an operator-selected symptom or an operator-selected root cause problem.

7. The method according to claim 1, wherein said symptoms further comprise at least one ranking attribute, further comprising:
  grouping said events that correlate with said ones of said select symptoms; and
  selectively presenting said symptoms based upon said ranking attribute so as to visualize at least one of a severity or a priority of an associated symptom.

8. The method according to claim 1, further comprising:
  dynamically updating at least one event correlation rule of an associated symptom in response to new information understood about at least one of an associated event, said operator-identified symptom, and a corresponding root cause problem.

9. A computer system for allowing an operator to identify a root cause to a problem comprising:
  a symptom database comprising records of symptoms, wherein each of said symptoms relates to at least one associated root cause problem and comprises at least one event correlation rule, each correlation rule having at least one predicate thereof;
  a monitor for collecting events from at least one event source;
  an extractor for extracting symptoms from said systems database;
  an analyzer for iteratively performing a symptom analysis based upon the collection of new events comprising:
    correlating said collected new events with said symptoms, wherein a select event participates with a select symptom if said select event satisfies at least one predicate of an associated event correlation rule of said select symptom; and
    dynamically updating a prediction of the likelihood that ones of said select symptoms will occur based at least upon current predicates of said event correlation rules of said select symptoms that are satisfied by said collected events; and
  a visualizer for grouping said events that correlate with said ones of said select symptoms and for providing a user-directed visualization of said groupings.

10. The system according to claim 9, further comprising a first interface for dynamically updating at least one event correlation rule of an associated symptom in response to new information understood about at least one of an associated event, said operator-identified symptom, and a corresponding root cause problem.

11. The system according to claim 9, wherein:
  said extractor further extracts symptom categories that are associated with the extracted symptoms, each symptom category having a category visualization attribute; and
  said visualizer further associates said category visualization attributes to said groups of events.

12. The system according to claim 11, wherein said visualizer organizes and presents said events utilizing color and color gradient visualization attributes.

13. The system according to claim 9, further comprising and event adaptor for converting events to a standardized event format prior to processing by said monitor.

14. The system according to claim 9, wherein:
  said analyzer is further configured to read a weight attribute associated with various ones of said symptoms and dynamically update changes in participation of events in multi-symptom patterns based at least upon said weight attribute; and
  said visualization is based further upon corresponding weighted values.

15. The system according to claim 9, wherein said visualizer further comprises:
  an events window for selectively organizing and presenting events and symptoms; and
  navigational tools that allow a operator to selectively zoom in and to zoom out of events shown in said events window by locating events associated with symptoms selected by said operator.

16. A computer program product for visualizing events to allow an operator to identify a root cause to a problem comprising:
   a computer usable medium having computer usable program code embodied therewith, the computer usable medium comprising:
   computer usable program code configured for retrieving select symptoms from a symptoms database, wherein each of said symptoms relates to at least one associated root cause problem and comprises at least one event correlation rule, each correlation rule having at least one predicate thereof; and
   computer usable program code configured for iteratively performing a symptom analysis comprising:
      collecting new events from at least one event source to be considered by said symptom analysis;
      correlating said collected events with said symptoms, wherein a select event participates with a select symptom if said select event satisfies at least one predicate of an associated event correlation rule of said select symptom;
      dynamically updating a prediction of the likelihood that ones of said select symptoms will occur based at least upon current predicates of said event correlation rules of said select symptoms that are satisfied by said collected events; and
      conveying information corresponding to said prediction of the likelihood that ones of said select symptoms will occur.

17. The computer program product according to claim 16, wherein said symptoms further comprise a description of said symptom and a recommendation of action, and said computer program product further comprises:
   computer usable program code configured for grouping said events that correlate with said ones of said select symptoms;
   computer usable program code configured for providing a user-directed visualization of said groupings; and
   computer usable program code configured for selectively presenting said description and recommendation information associated with at least one of an operator-selected event, an operator-selected symptom or an operator-selected root cause problem.

18. The computer program product according to claim 16, wherein said symptoms further comprise a weight attribute, and said computer program product further comprises:
   computer usable program code configured for dynamically updating changes in participation of events in multi-symptom patterns based at least upon said weight attribute.

19. The computer program product according to claim 16, further comprising:
   computer usable program code configured for dynamically updating at least one event correlation rule of an associated symptom in response to operator derived information understood about at least one of an associated event, said operator-identified symptom, and a corresponding root cause problem.

20. The computer program product according to claim 16, wherein said symptoms further comprise at least one ranking attribute, and said computer program product further comprises:
   computer usable program code configured for grouping said events that correlate with said ones of said select symptoms; and
   computer usable program code configured for selectively presenting said symptoms based upon said ranking attribute so as to visualize at least one of a severity or a priority of an associated symptom.

* * * * *

UNITED STATES PATENT AND TRADEMARK OFFICE
CERTIFICATE OF CORRECTION

PATENT NO. : 7,251,584 B1
APPLICATION NO. : 11/374672
DATED : July 31, 2007
INVENTOR(S) : Perazolo et al.

Page 1 of 1

It is certified that error appears in the above-identified patent and that said Letters Patent is hereby corrected as shown below:

Title page item 74 and Col. 1

In the Title:

"INCREMENTAL DETECTION AND VISUALIZATION OF PROBLEM PATTERNS AND SYMPTOMS BASED MONITORED EVENTS"

should read:

-- INCREMENTAL DETECTION AND VISUALIZATION OF PROBLEM PATTERNS AND SYMPTOMS BASED UPON MONITORED EVENTS --.

Signed and Sealed this

Twenty-sixth Day of February, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,251,584 B1 |
| APPLICATION NO. | : 11/374672 |
| DATED | : July 31, 2007 |
| INVENTOR(S) | : Perazolo et al. |

It is certified that error appears in the above-identified patent and that said Letters Patent is hereby corrected as shown below:

Title page item [54] and Col. 1

In the Title:

"INCREMENTAL DETECTION AND VISUALIZATION OF PROBLEM PATTERNS AND SYMPTOMS BASED MONITORED EVENTS"

should read:

-- INCREMENTAL DETECTION AND VISUALIZATION OF PROBLEM PATTERNS AND SYMPTOMS BASED UPON MONITORED EVENTS --.

This certificate supersedes the Certificate of Correction issued February 26, 2008.

Signed and Sealed this

Eighteenth Day of March, 2008

JON W. DUDAS
*Director of the United States Patent and Trademark Office*